United States Patent
Shin et al.

(10) Patent No.: US 11,461,046 B2
(45) Date of Patent: Oct. 4, 2022

(54) MEMORY SYSTEM WITH MEMORY CONTROLLER MANAGING AN ACCUMULATED ERASE COUNT VALUE AND AN OPEN BLOCK ERASE COUNT VALUE AND METHOD OF OPERATING THE SAME

(71) Applicant: SK hynix Inc., Gyeonggi-do (KR)

(72) Inventors: Na Ra Shin, Gyeonggi-do (KR); Jung Sik Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 77 days.

(21) Appl. No.: 16/937,219

(22) Filed: Jul. 23, 2020

(65) Prior Publication Data
US 2021/0247933 A1    Aug. 12, 2021

(30) Foreign Application Priority Data

Feb. 11, 2020  (KR) .................. 10-2020-0016611

(51) Int. Cl.
*G06F 3/06* (2006.01)

(52) U.S. Cl.
CPC ............ *G06F 3/0659* (2013.01); *G06F 3/064* (2013.01); *G06F 3/0616* (2013.01); *G06F 3/0653* (2013.01); *G06F 3/0673* (2013.01)

(58) Field of Classification Search
CPC ...... G06F 3/0659; G06F 3/0616; G06F 3/064; G06F 3/0653; G06F 3/0673; G06F 3/0679; G06F 12/0246; G11C 16/16; G11C 16/0483; G11C 16/26
USPC .............................. 711/103, 154; 365/185.01
See application file for complete search history.

(56) References Cited

U.S. PATENT DOCUMENTS

| | | | |
|---|---|---|---|
| 2013/0021847 A1* | 1/2013 | Park | G11C 16/349 365/185.03 |
| 2019/0179741 A1* | 6/2019 | Liu | G06F 3/0679 |
| 2020/0042181 A1* | 2/2020 | Lee | G06F 12/0246 |
| 2020/0241797 A1* | 7/2020 | Kanno | G06F 3/0688 |

FOREIGN PATENT DOCUMENTS

| | | |
|---|---|---|
| KR | 10-2017-0078310 | 7/2017 |
| KR | 10-2019-0052083 | 5/2019 |

* cited by examiner

*Primary Examiner* — Hong C Kim
(74) *Attorney, Agent, or Firm* — IP & T Group LLP (57) ABSTRACT

Provided herein may be a memory system and a method of operating the memory system. The memory system may include a memory device including a plurality of memory blocks, and a memory controller configured to: manage an accumulated erase count value and an open block erase count value of each of the plurality of memory blocks, and select a target memory block on which a program operation is to be performed based on the accumulated erase count value and the open block erase count value of each of the plurality of memory blocks.

15 Claims, 8 Drawing Sheets

MEMORY SYSTEM WITH MEMORY CONTROLLER MANAGING AN ACCUMULATED ERASE COUNT VALUE AND AN OPEN BLOCK ERASE COUNT VALUE AND METHOD OF OPERATING THE SAME

CROSS-REFERENCE TO RELATED APPLICATION

The present application claims priority under 35 U.S.C. § 119(a) to Korean patent application number 10-2020-0016611, filed on Feb. 11, 2020, which is incorporated herein by reference in its entirety.

BACKGROUND

Field of Invention

Various embodiments of the present disclosure generally relate to a memory system and a method of operating the memory system, and more particularly, to a memory system having enhanced reliability, and a method of operating the memory system.

Description of Related Art

Recently, the paradigm for the computer environment has transitioned to ubiquitous computing in which computer systems can be used anytime and anywhere. Thereby, the use of portable electronic devices such as mobile phones, digital cameras, and notebook computers has rapidly increased. In general, such portable electronic devices use a memory system which employs a memory device, in other words, a data storage device. The data storage device is used as a main memory device or an auxiliary memory device of the portable electronic devices.

A data storage device provides advantages in that, since there is no mechanical driving part, stability and durability are excellent, information access speed is relatively high, and power consumption is relatively low. Examples of a data storage device having such advantages include a universal serial bus (USB) memory device, a memory card having various interfaces, and a solid state drive (SSD).

SUMMARY

Various embodiments of the present disclosure area directed to a memory system capable of improving reliability of memory blocks, and a method of the memory system.

An embodiment of the present disclosure may provide for a memory system including: a memory device including a plurality of memory blocks; and a memory controller configured to: manage an accumulated erase count value and an open block erase count value of each of the plurality of memory blocks, and select a target memory block on which a program operation is to be performed based on the accumulated erase count value and the open block erase count value of each of the plurality of memory blocks.

An embodiment of the present disclosure may provide for a method of operating a memory system including: performing an erase operation on a selected memory block among a plurality of memory blocks; increasing an accumulated erase count value of the selected memory block; increasing an open block erase count value of the selected memory block when the selected memory block is in an open block state when the erase operation is performed; and updating the accumulated erase count value and the open block erase count value of the selected memory block.

An embodiment of the present disclosure may provide for a method of operating a memory system including: selecting a target memory block based on a priority order of a plurality of memory blocks; and performing a program operation on the target memory block. The priority order of the plurality of memory blocks may be determined based on respective accumulated erase count values and respective open block erase count values of the plurality of memory blocks.

An embodiment of the present disclosure may provide for an operating method of a controller, the operating method including: incrementing first and second erase counts of each memory block at each erase operation on the memory block; selecting a free block in a descending order of the second erase count among plural free blocks selected in an ascending order of the first erase count; and controlling a memory device to perform a write operation on the selected block, wherein the first erase count represents a total number of times the erase operation has been performed, wherein the second erase count represents a number of the times the erase operation has performed while the corresponding memory block is in an open block state.

DETAILED DESCRIPTION

Specific structural and functional description provided herein is directed to embodiments of the present disclosure. The present invention, however, may be configured and carried out in various other ways. Thus, the present invention is not limited by or to the disclosed embodiments nor specific details thereof. Throughout the specification, reference to "an embodiment," "another embodiment" or the like is not necessarily to only one embodiment, and different references to any such phrase are not necessarily to the same embodiment(s).

Various embodiments of the present disclosure are described more fully below with reference to the accompanying drawings, in which preferred embodiments of the present disclosure are shown, so that those of ordinary skill in the art can easily carry out and practice the present invention.

Figure 1:
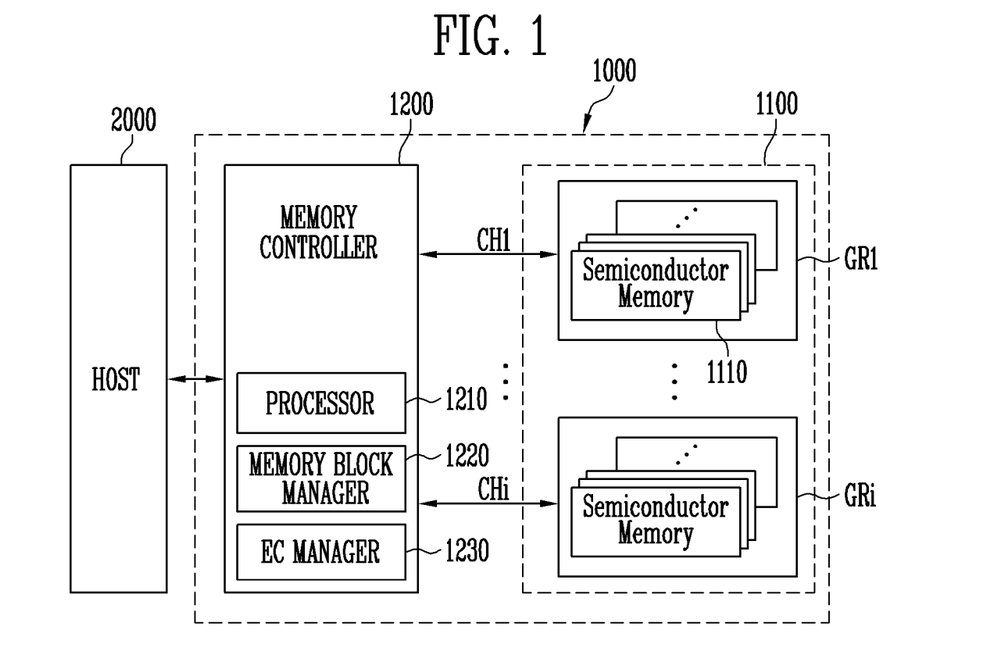
FIG. 1 is a diagram illustrating a memory system in accordance with an embodiment of the present disclosure.

FIG. 1 is a diagram illustrating a memory system 1000 in accordance with an embodiment of the present disclosure.

Referring to FIG. 1, the memory system 1000 may include a memory device 1100 and a memory controller 1200. The memory system 1000 may further include a buffer memory (not illustrated). The memory device 1100 may include a plurality of semiconductor memories 1110. The plurality of semiconductor memories 1110 may be divided into a plurality of memory groups GR1 to GRi. Each of the plurality of semiconductor memories 1110 may be formed of, e.g., a memory chip.

FIG. 1 illustrates that the plurality of memory groups GR1 to GRi communicate with the memory controller 1200 through first to i-th channels CH1 to CHi, respectively. A representative semiconductor memory 1110 is described in detail below with reference to FIG. 3.

Each of the plurality of semiconductor memories 1110 may include a plurality of memory blocks. The plurality of memory blocks may perform a program operation of storing data, a read operation of reading the stored data, an erase operation of erasing the stored data, and the like.

The memory controller 1200 is connected between a host 2000 and the memory device 1100. The memory controller 1200 may access the memory device 1100 in response to a request from the host 2000. For example, the memory controller 1200 may control a read operation, a program operation, an erase operation, and a background operation, such as a read reclaim operation, of the memory device 1100 in response to a request received from the host 2000. The memory controller 1200 may provide an interface between the memory device 1100 and the host 2000. The memory controller 1200 may drive firmware for controlling the memory device 1100.

The memory controller 1200 may include a processor 1210, a memory block manager 1220, and an erase count (EC) manager 1230.

The processor 1210 may control overall operation of the memory controller 1200 and perform a logical operation. The processor 1210 may communicate both with the host 2000 and with the memory device 1100. The processor 1210 may rearrange a plurality of host commands received from the host 2000 according to a priority order and generate a command queue, and may generate a command for controlling the memory device 1100 according to the command queue and transmit the command to the memory device 1100. The processor 1210 may include a flash translation layer. The flash translation layer may map a physical address corresponding to an address (e.g., a logical address) input from the host 2000 during a program operation. Furthermore, during a read operation, the flash translation layer may check a physical address mapped to a logical address input from the host 2000.

The memory block manager 1220 may manage a plurality of memory blocks included in the memory device 1100. For example, the memory block manager 1220 may control the memory device 1100 to select a memory block that is in an erased state among the plurality of memory blocks in the memory device 1100 and perform a program operation on the selected memory block. When selecting a memory block on which the program operation is to be performed, the memory block manager 1220 may preferentially select a memory block having a lowest accumulated erase count among memory blocks that are in the erased state. The memory blocks that are in the erased state may be defined as free blocks. In the case where the number of free blocks having the lowest accumulated erase count is greater than the number of memory blocks to be selected, the memory block manager 1220 may preferentially select memory blocks that have a highest erase count when in an open block state, among the free blocks having the lowest accumulated erase count. The open block state may indicate that no data is stored in at least one page among the plurality of pages included in the memory block so that an additional program operation can be performed on the memory block. A close block state may indicate that data is stored in all pages in the memory block so that an additional program operation cannot be performed on the memory block. A memory block in an open block state (open memory block) may include an unprogrammed page. During an erase operation, the amount of stress applied to the unprogrammed page is less than that of programmed pages. Therefore, the amount of erase stress applied to an open memory block is less than that of a memory block in a close block state (closed memory block). The memory block manager 1220 may preferentially select a free block having a smallest accumulated erase count so that program-erase counts of the plurality of memory blocks to control the degrees of wear of memory blocks to be uniform with each other. Furthermore, the memory block manager 1220 may preferentially select a free block having a relatively high erase count when in the open block state among free blocks having the same accumulated erase count, so that a free block having relatively low erase stress may be preferentially selected when the program operation is performed. Thereby, the degrees of wear of the plurality of memory blocks in the memory device 1100 may be controlled to be more uniform with each other. Consequently, the reliability of the memory blocks may be improved.

The EC manager 1230 may manage an accumulated EC value and an open block EC value of each of the plurality of memory blocks in the memory device 1100. For a given memory block, the accumulated EC value may be the sum of the erase count value of the memory block in the open block state and an erase count value of the memory block in the close block state. After an erase operation is completed, the EC manager 1230 may increase the accumulated EC value of the memory block on which the erase operation has been performed, and then update the accumulated EC value. If the erase operation has been performed on the memory block in the open block state, each of the accumulated EC value and the open block EC value of the memory block on which the erase operation has been performed is increased and updated.

The memory controller 1200 and the memory device 1100 may be integrated into a single semiconductor device. In an embodiment, the memory controller 1200 and the memory device 1100 may be integrated into a single semiconductor device to form a memory card, such as a personal computer memory card international association (PCMCIA), a compact flash card (CF), a smart media card (SM or SMC), a memory stick multimedia card (MMC, RS-MMC, or MMC-micro), a SD card (SD, miniSD, microSD, or SDHC), or a universal flash storage (UFS).

The memory controller 1200 and the memory device 1100 may be integrated into a single semiconductor device to form a solid state drive (SSD). The SSD may include a storage device configured to store data in a semiconductor memory. When the memory system 1000 is used as the SSD, the operating speed of the host 2000 coupled to the memory system 1000 may be greatly improved.

In an embodiment, the memory system 1000 may be provided as one of various elements of an electronic device such as a computer, an ultra mobile PC (UMPC), a workstation, a net-book, a personal digital assistants (PDA), a portable computer, a web tablet, a wireless phone, a mobile phone, a smart phone, an e-book, a portable multimedia player (PMP), a game console, a navigation device, a black box, a digital camera, a 3-dimensional television, a digital audio recorder, a digital audio player, a digital picture recorder, a digital picture player, a digital video recorder, a digital video player, a device capable of transmitting/receiving information in an wireless environment, one of various devices for forming a home network, one of various electronic devices for forming a computer network, one of various electronic devices for forming a telematics network, an RFID device, one of various elements for forming a computing system, or the like.

In an embodiment, the memory device 1100 or the memory system 1000 may be embedded in any of various types of packages. For example, the memory device 1100 or the memory system 1000 may be packaged in a Package on Package (PoP), Ball grid arrays (BGAs), Chip scale packages (CSPs), Plastic Leaded Chip Carrier (PLCC), Plastic Dual In Line Package (PDIP), Die in Waffle Pack, Die in Wafer Form, Chip On Board (COB), Ceramic Dual In Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), System In Package (SIP), Multi Chip Package (MCP), Wafer-level Fabricated Package (WFP), or Wafer-Level Processed Stack Package (WSP).

Figure 2:
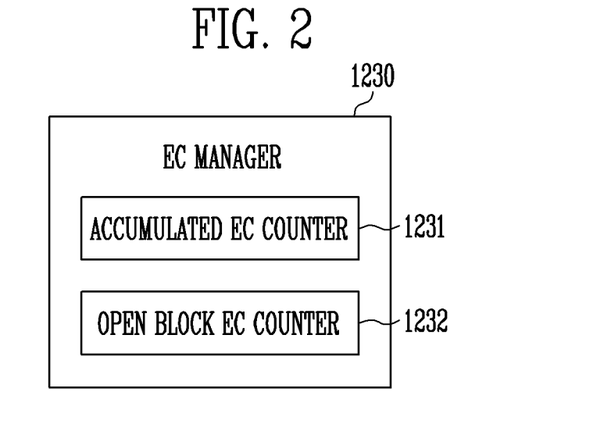
FIG. 2 is a diagram illustrating an erase count (EC) manager, such as that of FIG. 1.

FIG. 2 is a diagram illustrating the EC manager 1230 of FIG. 1.

Referring to FIG. 2, the EC manager 1230 may include an accumulated EC counter 1231, and an open block EC counter 1232.

The accumulated EC counter 1231 may count and manage an accumulated EC value of each of the plurality of memory blocks in the memory device 1100 of FIG. 1. The accumulated EC value may be the sum of an open block EC value and a close block EC value of the corresponding memory block.

The open block EC counter 1232 may count and manage an open block EC value of each of the plurality of memory blocks in the memory device 1100. The open block EC value may correspond to the number of times the corresponding memory block has performed an erase operation when in the open block state.

Figure 3:
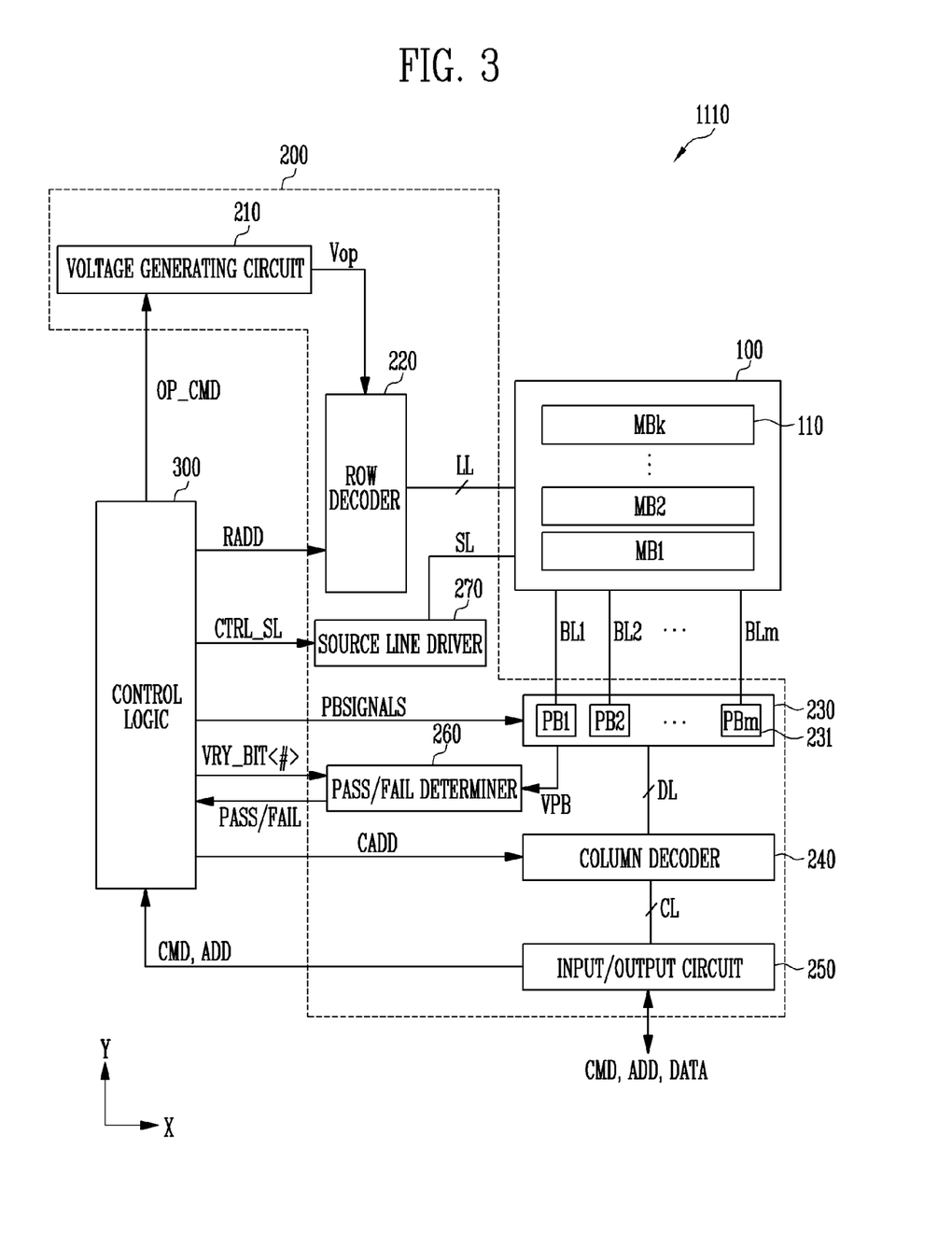
FIG. 3 is a diagram illustrating a semiconductor memory, such as that of FIG. 1.

FIG. 3 is a diagram illustrating the semiconductor memory of FIG. 1.

Referring to FIG. 3, the semiconductor memory 1110 may include a memory cell array 100 configured to store data. The semiconductor memory 1110 may include a peripheral circuit 200 configured to perform a program operation for storing data in the memory cell array 100, a read operation for outputting the stored data, and an erase operation for erasing the stored data. The semiconductor memory 1110 may include control logic 300 configured to control the peripheral circuit 200 under control of the memory controller 1200 (shown FIG. 1).

The memory cell array 100 may include a plurality of memory blocks MB1 to MBk 110; k is a positive integer. Local lines LL and bit lines BL1 to BLm (m is a positive integer) may be coupled to each of the memory blocks MB1 to MBk. For example, the local lines LL may include a first select line, a second select line, and a plurality of word lines arranged between the first and second select lines. Furthermore, the local lines LL may include dummy lines arranged between the first select line and the word lines and between the second select line and the word lines. Here, the first select line may be a source select line, and the second select line may be a drain select line. For example, the local lines LL may include word lines, drain and source select lines, and source lines. For example, the local lines LL may further include dummy lines. For example, the local lines LL may further include pipelines. The local lines LL may be coupled to each of the memory blocks MB1 to MBk. The bit lines BL1 to BLm may be coupled in common to the memory blocks MB1 to MBk. The memory blocks MB1 to MBk may be embodied in a two- or three-dimensional structure. For example, in the memory blocks 110 having a two-dimensional structure, the memory cells may be arranged in a direction parallel to a substrate. For instance, in the memory blocks 110 having a three-dimensional structure, the memory cells may be stacked in a direction perpendicular to the substrate.

The peripheral circuit 200 may perform a program operation, a read operation, or an erase operation on a selected memory block 110 under control of the control logic 300.

For instance, the peripheral circuit 200 may include a voltage generating circuit 210, a row decoder 220, a page buffer group 230, a column decoder 240, an input/output circuit 250, a pass/fail determiner 260, and a source line driver 270.

The voltage generating circuit 210 may generate various operating voltages Vop to be used for a program operation, a read operation, and an erase operation in response to an operating signal OP_CMD. For example, the voltage generating circuit 210 may generate a program voltage, a verify voltage, pass voltages, a read voltage, a source line voltage, etc. under control of the control logic 300.

The row decoder 220 may transmit operating voltages Vop to local lines WL coupled to a selected memory block 110 in response to a row address RADD.

The page buffer group 230 may include a plurality of page buffers PB1 to PBm (231) coupled to the bit lines BL1 to BLm. The page buffers PB1 to PBm (231) may operate in response to page buffer control signals PBSIGNALS. For example, during a program operation, the page buffers PB1 to PBm (231) may temporarily store data received through the data lines DL, and thereafter control voltage levels of the bit lines BL1 to BLm based on the temporarily stored data. During a read or verify operation, the page buffers PB1 to PBm (231) may sense voltages or currents of the bit lines BL1 to BLm.

The column decoder 240 may transmit data between the input/output circuit 250 and the page buffer group 230 in response to a column address CADD. For example, the column decoder 240 may exchange data with the page buffers 231 through data lines DL or exchange data with the input/output circuit 250 through column lines CL.

The input/output circuit 250 may transmit an internal command CMD or an address ADD received from the memory controller (1200 of FIG. 1) to the control logic 300, or exchange data with the column decoder 240.

During a read operation or a verify operation, the pass/fail determiner 260 may generate a reference current in response to an enable bit VRY_BIT<#>, and may compare a sensing voltage VPB received from the page buffer group 230 with a reference voltage generated by the reference current and output a pass signal PASS or a fail signal FAIL.

The source line driver 270 may be coupled with the memory cells in the memory cell array 100 through the source lines SL and control the voltage of a source node. For example, the source line driver 270 may electrically couple the source node of the memory cell to a ground node during the read or verify operation. Furthermore, the source line driver 270 may apply a ground voltage to the source node of the memory cell during a program operation. Furthermore, the source line driver 270 may apply an erase voltage to the source node of the memory cell during an erase operation. The source line driver 270 may receive a source line control signal CTRL_SL from the control logic 300, and control the voltage of the source node based on the source line control signal CTRL_SL.

The control logic 300 may output an operating signal OP_CMD, a row address RADD, page buffer control signals PBSIGNALS, and an enable bit VRY_BIT<#> in response to the internal command CMD and the address ADD to control the peripheral circuits 200. In addition, the control logic 300 may determine whether a target memory cell has passed a verification during a verify operation in response to a pass signal PASS or a fail signal FAIL.

Figure 4:
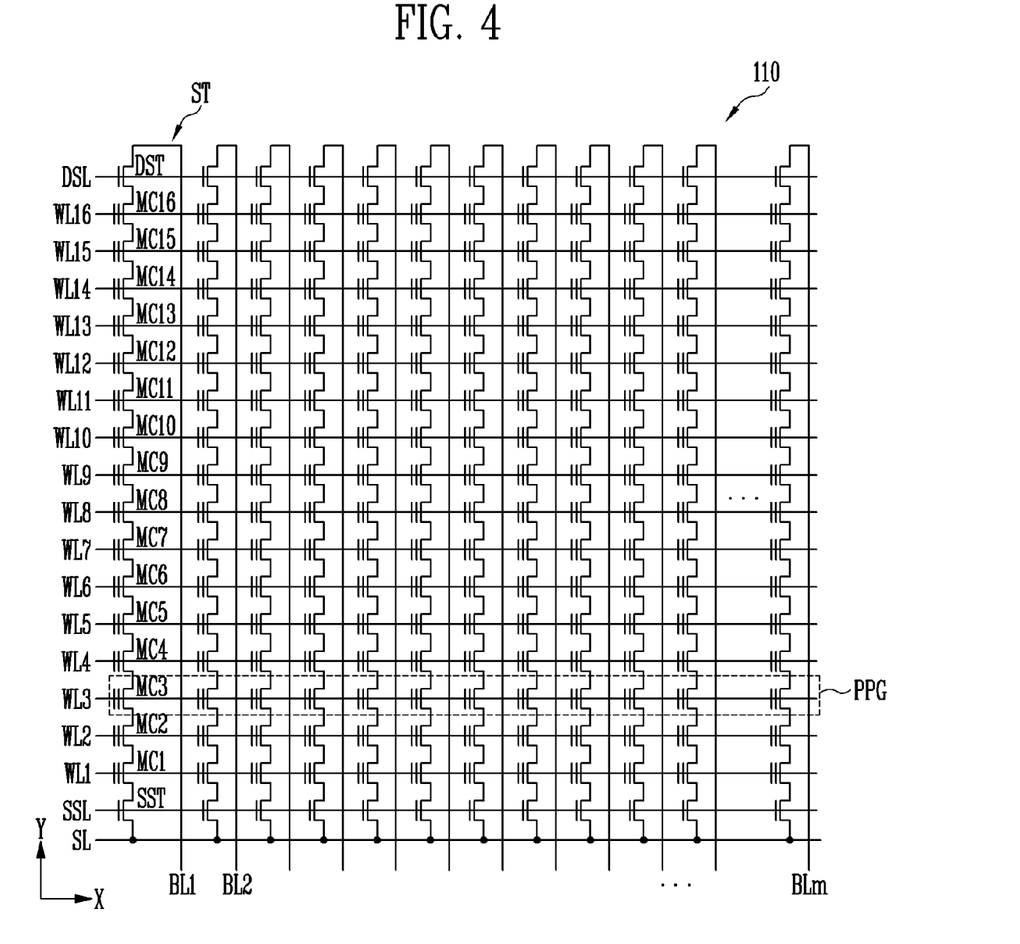
FIG. 4 is a diagram illustrating a memory block, such as that of FIG. 3.

FIG. 4 is a diagram illustrating a representative memory block 110 of FIG. 3.

Referring to FIG. 4, in the memory block 110, a plurality of word lines arranged parallel to each other may be coupled between a first select line and a second select line. Here, the first select line may be a source select line SSL, and the second select line may be a drain select line DSL. In more detail, the memory block 110 may include a plurality of strings ST coupled between the bit lines BL1 to BLm and the source line SL. The bit lines BL1 to BLm may be respectively coupled to the strings ST, and the source line SL may be coupled in common to the strings ST. Each of the strings ST may have the same configuration; therefore, the string ST that is coupled to the first bit line BL1 is described in detail by way of example.

The string ST may include a source select transistor SST, a plurality of memory cells MC1 to MC16, and a drain select transistor DST which are coupled in series to each other between the source line SL and the first bit line BL1. At least one source select transistor SST and at least one drain select transistor DST may be included in each string ST, and each string ST may include more than the 16 memory cells (MC1 to MC16) shown in FIG. 4.

A source of the source select transistor SST may be coupled to the source line SL, and a drain of the drain select transistor DST may be coupled to the first bit line BL1. The memory cells MC1 to MC16 may be coupled in series between the source select transistor SST and the drain select transistor DST. Gates of the source select transistors SST included in different strings ST may be coupled to the source select line SSL, gates of the drain select transistors DST may be coupled to the drain select line DSL, and gates of the memory cells MC1 to MC16 may be coupled to the plurality of word lines WL1 to WL16. Among the memory cells included in different strings ST, a group of memory cells coupled to each word line may be referred to as a physical page PPG. Therefore, the number of physical pages PPG included in the memory block 110 may correspond to the number of word lines WL1 to WL16.

Figure 5:
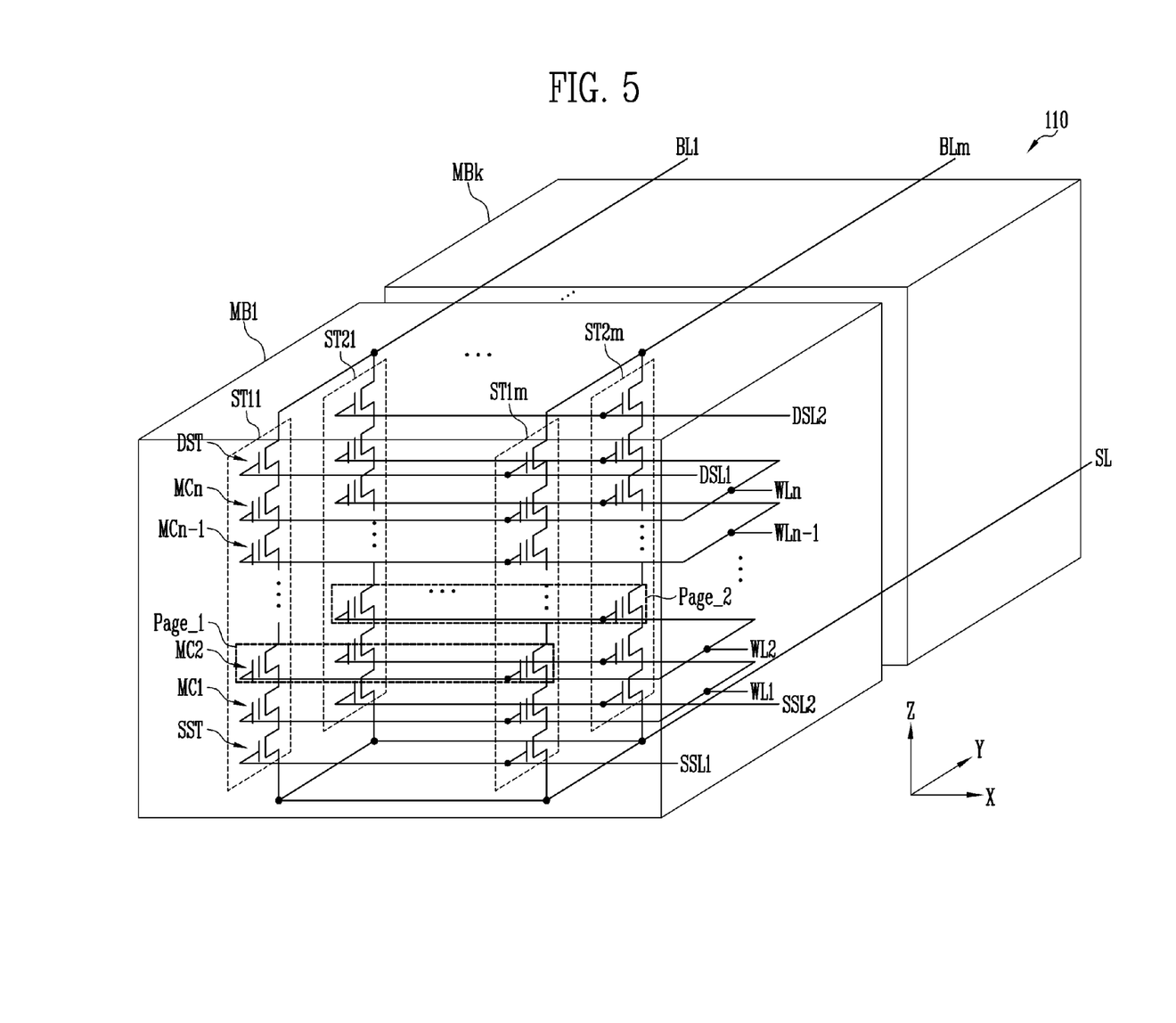
FIG. 5 is a diagram illustrating a memory block having a three-dimensional structure in accordance with an embodiment of the present disclosure.

FIG. 5 is a diagram illustrating a memory block having a three-dimensional structure in accordance with an embodiment of the present disclosure.

Referring to FIG. 5, the memory cell array 100 may include a plurality of memory blocks MB1 to MBk. Each memory block 110 may include a plurality of strings ST11 to ST1*m* and ST21 to ST2*m*. Each of the strings ST11 to ST1*m* and ST21 to ST2*m* may extend in a vertical direction (i.e., in a Z direction). In each memory block 110, m strings may be arranged in a row direction (i.e., in an X direction). FIG. 5 illustrates that two strings are arranged in a column direction (i.e., in a Y direction), but this is only for clarity. For example, three or more strings may be arranged in the column direction (the Y direction).

Each of the strings ST11 to ST1*m* and ST21 to ST2*m* may include at least one source select transistor SST, first to n-th memory cells MC1 to MCn, and at least one drain select transistor DST.

The source select transistor SST of each string may be coupled between the source line SL and the memory cells MC1 to MCn. Source select transistors of strings arranged in the same row may be coupled to the same source select line. The source select transistors of the strings ST11 to ST1*m* arranged in a first row may be coupled to a first source select line SSL1. The source select transistors of the strings ST21 to ST2*m* arranged in a second row may be coupled to a second source select line SSL2. In an embodiment, the source select transistors of the strings ST11 to ST1*m* and ST21 to ST2*m* may be coupled in common to a single source select line.

The first to n-th memory cells MC1 to MCn in each string may be coupled in series between the source select transistor SST and the drain select transistor DST. Gates of the first to n-th memory cells MC1 to MCn may be respectively coupled to first to n-th word lines WL1 to WLn.

In an embodiment, at least one of the first to n-th memory cells MC1 to MCn may be used as a dummy memory cell. When a dummy memory cell is provided, the voltage or the current of the corresponding string may be stably controlled. Thereby, the reliability of data stored in each memory block 110 may be improved.

The drain select transistor DST of each string may be coupled between the corresponding bit line and the memory cells MC1 to MCn. Drain select transistors DST of strings arranged in the row direction may be coupled to corresponding drain select lines extending in the row direction. The drain select transistors DST of the strings ST11 to ST1*m* in the first row may be coupled to a first drain select line DSL1. The drain select transistors DST of the strings ST21 to ST2*m* in the second row may be coupled to a second drain select line DSL2.

Each of the first to n-th word lines WL1 to WLn may correspond to at least one page. For example, the second word line WL2 may correspond to a first page Page_1 including the second memory cells MC2 included in the strings ST11 to ST1*m* in the first row and a second page Page_2 including the second memory cells MC2 included in the strings ST21 to ST1*m* in the second row.

Figure 6:
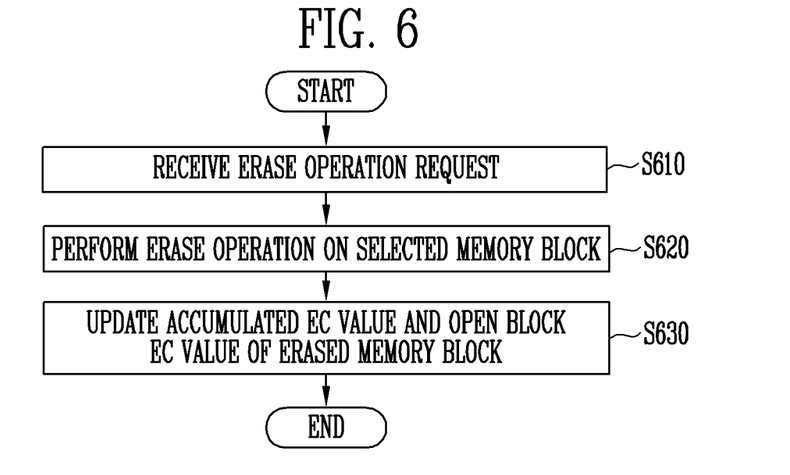
FIG. 6 is a flowchart of a method of performing an erase operation of a memory system in accordance with an embodiment of the present disclosure.

FIG. 6 is a flowchart for describing a method of performing an erase operation of a memory system in accordance with an embodiment of the present disclosure.

The erase operation method is described with reference to FIGS. 1 to 6.

When a request (a host command) corresponding to an erase operation is received from the host 2000 (at step S610), the processor 1210 of the memory controller 1200 may generate a command queue by queuing a host command received from the host 2000. The processor 1210 may generate a command CMD for controlling the erase operation of the memory device 1100 according to the command queue, and transmit the generated command CMD and an address ADD corresponding to a memory block on which the erase operation is to be performed, to a selected semiconductor memory of the plurality of semiconductor memories 1110 in the memory device 1100.

The selected semiconductor memory that has received the command CMD and the address ADD corresponding to the erase operation from the memory controller 1200 may perform an erase operation on at least one selected memory block (e.g., MB1) of the plurality of memory blocks MB1 to MBk in response to the command CMD and the address ADD (at step S620). The erase operation may be performed in such a way that a gate induced drain leakage (GIDL) current is drawn into a channel of a string by applying a pre-erase voltage to the source line and, thereafter, data stored in the memory cells in the string is erased by applying an erase voltage to the source line.

When the erase operation on the selected memory block MB1 is completed, the EC manager 1230 of the memory controller 1200 may update the accumulated EC value and the open block EC value of the memory block MB1 on which the erase operation has been performed (at step S630). For example, the accumulated EC counter 1231 of the EC manager 1230 may increase, by 1, the accumulated EC value of the memory block MB1 on which the erase operation has been performed and manage the accumulated EC value. When the erase operation has been performed on the memory block MB1 in the open block state, the open block EC counter 1232 of the EC manager 1230 may increase, by 1, each of the accumulated EC value and the open block EC value of the memory block MB1 on which the erase operation has been performed, and manage the accumulated EC value and the open block EC value. When the erase operation has been performed on the memory block MB1 in the close block state, the open block EC counter 1232 may increase, by 1, the accumulated EC value of the memory block MB1 on which the erase operation has been performed, and maintain the open block EC value at its existing value.

As described above, during an erase operation of the memory system 1000 in accordance with an embodiment of the present disclosure, the accumulated EC value of the memory block on which the erase operation has been performed may be increased by 1 and managed. When the erase operation has been performed on the memory block in the open block state, the open block EC value of the memory block on which the erase operation has been performed may be increased by 1 and managed. Therefore, the memory controller 1200 may manage the accumulated EC value and the open block EC value of each of the plurality of memory blocks in the memory device 1100.

Figure 7:
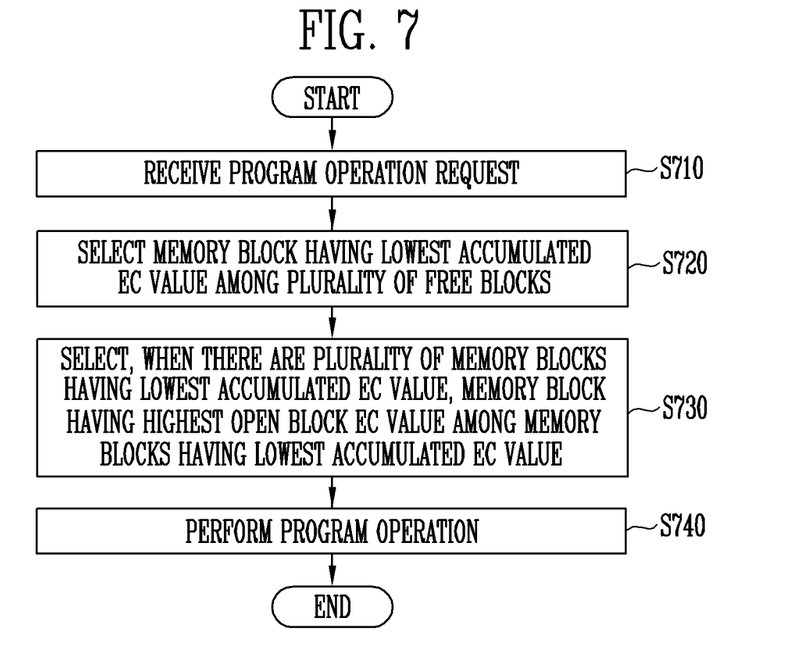
FIG. 7 is a flowchart of a method of performing a program operation of a memory system in accordance with an embodiment of the present disclosure.

FIG. 7 is a flowchart of a method of performing a program operation of the memory system in accordance with an embodiment of the present disclosure.

When a request (a host command) corresponding to a program operation is received from the host 2000 (at step S710), the processor 1210 of the memory controller 1200 may generate a command queue by queuing a host command received from the host 2000.

The memory block manager 1220 of the memory controller 1200 may select a target memory block on which the program operation is to be performed among free blocks in the memory device 1100, each of the free blocks being in an erased state. For example, when selecting the target memory block for the program operation, the memory block manager 1220 may select a memory block having a lowest accumulated EC value among the free blocks (at step S720). In other words, in the selection process, the memory block manager 1220 may prioritize memory blocks having lower accumulated EC values, with the highest priority being given to memory block(s) with the lowest accumulated EC value.

When there are at least two free blocks that have the same accumulated EC value, which is the lowest accumulated EC value, the memory block manager 1220 may select, from among these free blocks, the memory block having the highest open block EC value as a target memory block (at step S730). In other words, the memory block manager 1220 may process that a memory block having a larger open block EC value among the free blocks having the same accumulated EC value has a higher priority order. The memory block manager 1220 may select a free block on which the program operation is to be performed, with reference to the accumulated EC values and the open block EC values of the memory blocks that are managed by the EC manager 1230.

The processor 1210 may generate a command CMD for controlling the program operation of the memory device 1100 according to the command queue. The memory block manager 1220 may generate an address ADD corresponding to the selected memory block on which the program operation is to be performed. The memory controller 1200 may transmit the command CMD, the address ADD, and data to be programmed, to the semiconductor memory 1110 that includes the selected memory block.

The semiconductor memory 1110 that has received the command CMD, the address ADD, and data to be programmed from the memory controller 1200 may perform the program operation (at step S740). For example, the control logic 300 may control the peripheral circuit 200 to perform the program operation on the selected memory block (e.g., MB1) in response to the command CMD and the address ADD. The page buffer group 230 may temporarily store the data received from the memory controller 1200 through the input/output circuit 250 and the column decoder 240, and adjust the potential levels of the bit lines BL1 to BLm according to the temporarily stored data. The voltage generating circuit 210 may generate operating voltages Vop including a program voltage and a pass voltage. The row decoder 220 may apply the operating voltages Vop to the local lines LL of the selected memory block MB1. For example, the row decoder 220 may apply, to perform the program operation, the program voltage to a selected word line of the selected memory block MB1 and apply pass voltages to the other word lines.

As described above, in accordance with an embodiment of the present disclosure, during the program operation, the memory block manager 1220 may preferentially select a free block having a lowest accumulated erase count so as to make the program-erase counts of the plurality of memory blocks in the memory device 1100 more uniform, whereby the degrees of wear of memory blocks may be controlled to be uniform with each other. Furthermore, when there are multiple free blocks with same (lowest) accumulated erase count, the memory block manager 1220 may preferentially select, from among the multiple free blocks, the free block having the highest erase count in the open block state, so that a free block having relatively low erase stress may be preferentially selected when the program operation is performed. Thereby, the degrees of wear of the plurality of memory blocks in the memory device 1100 may be controlled to be more uniform with each other. Consequently, the reliability of the memory blocks may be improved.

Figure 8:
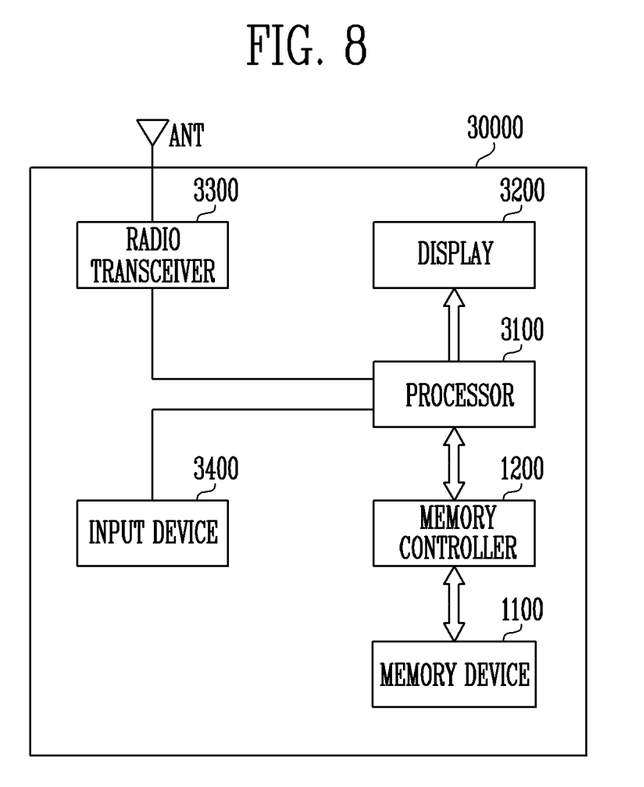
FIG. 8 is a diagram illustrating a memory system in accordance with an embodiment of the present disclosure.

FIG. 8 is a diagram illustrating a memory system 30000 in accordance with an embodiment of the present disclosure.

Referring to FIG. 8, the memory system 30000 may be embodied in a cellular phone, a smartphone, a tablet PC, a personal digital assistant (PDA) or a wireless communication device. The memory system 30000 may include a memory device 1100, and a memory controller 1200 configured to control the operation of the memory device 1100. The memory controller 1200 may control a data access operation, e.g., a program operation, an erase operation, or a read operation, of the memory device 1100 under control of a processor 3100.

Data programmed in the memory device 1100 may be outputted through a display 3200 under control of the memory controller 1200. The memory device 1100 may be configured and operate the same as the memory device 1100 of FIG. 1. The memory controller 1200 may be configured and operate the same as the memory controller 1200 of FIG. 1.

A radio transceiver 3300 may send and receive radio signals through an antenna ANT. For example, the radio transceiver 3300 may convert a radio signal received through the antenna ANT into a signal capable of being processed in the processor 3100. Therefore, the processor 3100 may process a signal output from the radio transceiver 3300 and transmit the processed signal to the memory controller 1200 or the display 3200. The memory controller 1200 may program a signal processed by the processor 3100 to the memory device 1100. Furthermore, the radio transceiver 3300 may change a signal output from the processor 3100 into a radio signal, and output the changed radio signal to an external device through the antenna ANT. An input device 3400 may be used to input a control signal for controlling the operation of the processor 3100 or data to be processed by the processor 3100. The input device 3400 may be embodied in a pointing device such as a touch pad and a computer mouse, a keypad or a keyboard. The processor 3100 may control the operation of the display 3200 such that data outputted from the memory controller 1200, data outputted from the radio transceiver 3300, or data outputted form the input device 3400 is outputted through the display 3200.

In an embodiment, the memory controller 1200 capable of controlling the operation of the memory device 1100 may be embodied as a part of the processor 3100 or a chip provided separately from the processor 3100.

Figure 9:
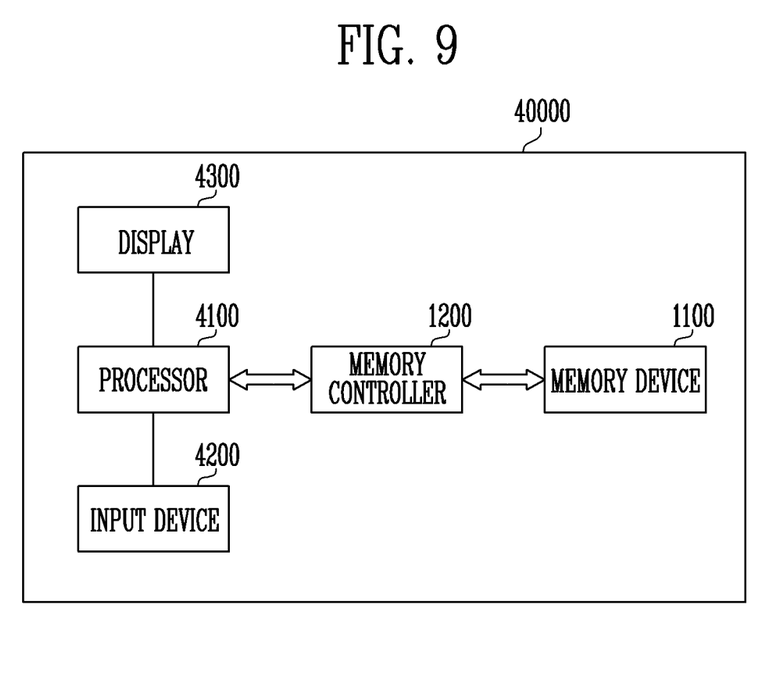
FIG. 9 is a diagram illustrating a memory system in accordance with an embodiment of the present disclosure.

FIG. 9 is a diagram illustrating a memory system 40000 in accordance with an embodiment of the present disclosure.

Referring to FIG. 9, the memory system 40000 may be embodied in a personal computer (PC), a tablet PC, a net-book, an e-reader, a personal digital assistant (PDA), a portable multimedia player (PMP), an MP3 player, or an MP4 player.

The memory system 40000 may include the memory device 1100, and a memory controller 1200 configured to control the data processing operation of the memory device 1100. The memory device 1100 may be configured and operate the same as the memory device 1100 of FIG. 1. The memory controller 1200 may be configured and operate the same as the memory controller 1200 of FIG. 1.

A processor 4100 may output data stored in the memory device 1100 through a display 4300, according to data inputted from an input device 4200. For example, the input device 4200 may be embodied in a pointing device such as a touch pad or a computer mouse, a keypad, or a keyboard.

The processor 4100 may control overall operation of the memory system 40000 and control the operation of the memory controller 1200. In an embodiment, the memory controller 1200 capable of controlling the operation of the memory device 1100 may be embodied as a part of the processor 4100 or a chip provided separately from the processor 4100.

Figure 10:
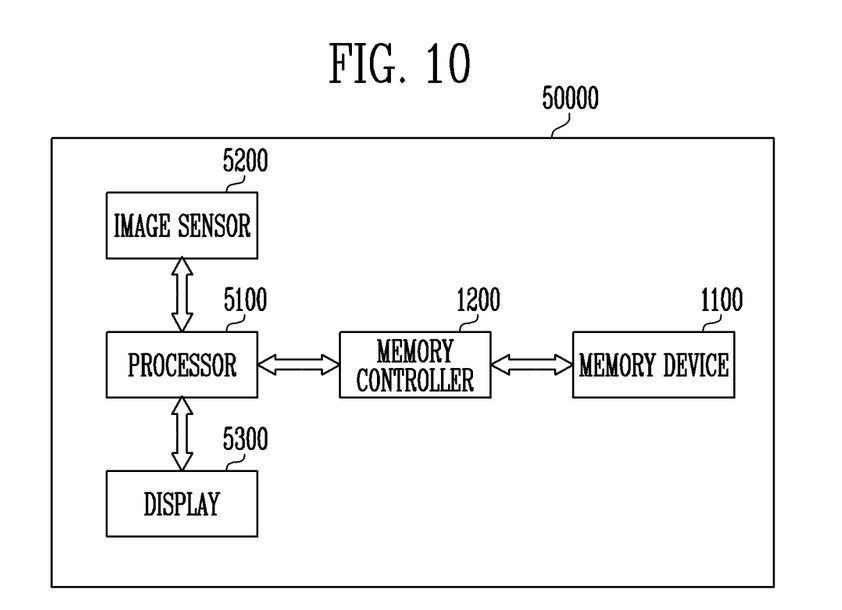
FIG. 10 is a diagram illustrating a memory system in accordance with an embodiment of the present disclosure.

FIG. 10 is a diagram illustrating a memory system 50000 in accordance with an embodiment of the present disclosure.

Referring to FIG. 10, the memory system 50000 may be embodied in an image processing device, e.g., a digital camera, a portable phone provided with a digital camera, a smartphone provided with a digital camera, or a tablet PC provided with a digital camera.

The memory system 50000 may include a memory device 1100, and a memory controller 1200 capable of controlling a data processing operation, e.g., a program operation, an erase operation, or a read operation, of the memory device 1100. The memory device 1100 may be configured and operate the same as the memory device 1100 of FIG. 1. The memory controller 1200 may be configured and operate the same as the memory controller 1200 of FIG. 1.

An image sensor 5200 of the memory system 50000 may convert an optical image into digital signals. The digital signals may be transmitted to a processor 5100 or the memory controller 1200. Under control of the processor 5100, the digital signals may be outputted through a display 5300 or stored in the memory device 1100 through the memory controller 1200. Data stored in the memory device 1100 may be outputted through the display 5300 under control of the processor 5100 or the memory controller 1200.

In an embodiment, the memory controller 1200 capable of controlling the operation of the memory device 1100 may be embodied as a part of the processor 5100 or a chip provided separately from the processor 5100.

Figure 11:
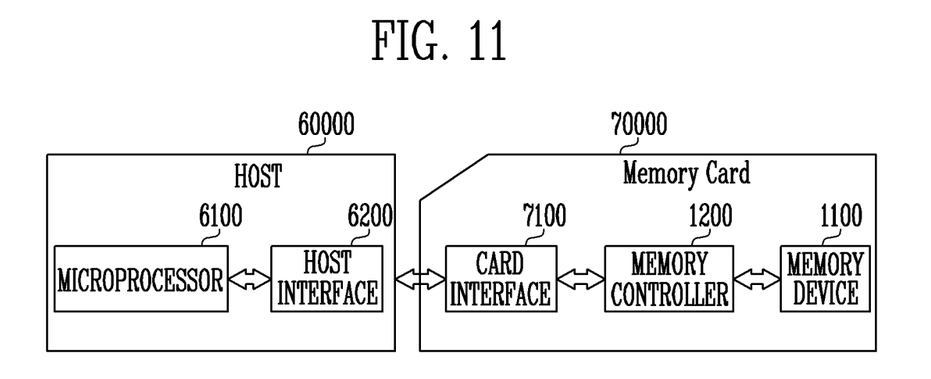
FIG. 11 is a diagram illustrating a memory system in accordance with an embodiment of the present disclosure.

FIG. 11 is a diagram illustrating a memory system 70000 in accordance with an embodiment of the present disclosure.

Referring to FIG. 11, the memory system 70000 may be embodied in a memory card or a smart card. The memory system 70000 may include a memory device 1100, a memory controller 1200, and a card interface 7100. The memory device 1100 may be configured and operate the same as the memory device 1100 of FIG. 1. The memory controller 1200 may be configured and operate the same as the memory controller 1200 of FIG. 1.

The controller 1200 may control data exchange between the memory device 1100 and the card interface 7100. In an embodiment, the card interface 7100 may be a secure digital (SD) card interface or a multimedia card (MMC) interface, but it is not limited thereto.

The card interface 7100 may interface data exchange between a host 60000 and the memory controller 1200 according to a protocol of the host 60000. In an embodiment, the card interface 7100 may support a universal serial bus (USB) protocol, and an interchip (IC)-USB protocol. Here, the card interface may refer to hardware capable of supporting a protocol which is used by the host 60000, software installed in the hardware, or a signal transmission scheme.

When the memory system 70000 is connected to a host interface 6200 of the host 60000 such as a PC, a tablet PC, a digital camera, a digital audio player, a cellular phone, console video game hardware or a digital set-top box, the host interface 6200 may perform data communication with the memory device 1100 through the card interface 7100 and the memory controller 1200 under control of a microprocessor 6100.

In embodiments of the present disclosure, a memory block on which a program operation is to be performed may be selected based on an accumulated erase count value and an open block erase count value. Consequently, the reliability of the memory blocks may be improved.

Various embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A memory system comprising:
a memory device including a plurality of memory blocks; and
a memory controller configured to:
manage an accumulated erase count value which represents a total number of erase operations performed on the plurality of memory blocks, respectively, and an open block erase count value, which represents a total number of erase operations that have been performed on the plurality of memory blocks, respectively while the plurality of memory blocks are in an open block state; and
select a target memory block on which a program operation is to be performed using both the accumulated erase count value and the open block erase count value of each of the plurality of memory blocks.

2. The memory system according to claim 1, wherein the open block state corresponds to a state in which at least one of a plurality of pages in the corresponding memory block is in an erased state.

3. The memory system according to claim 1, wherein the memory controller selects the target memory block based on a priority order, and determines that a memory block having a lowest accumulated erase count value among the plurality of memory blocks has a highest priority.

4. The memory system according to claim 3, wherein the memory controller determines that a memory block having a highest open block erase count value among a plurality of memory blocks having the lowest accumulated erase count value has a highest priority.

5. The memory system according to claim 1, wherein the memory controller comprises:
a processor configured to control an operation of the memory controller to perform an erase operation or the program operation on selected memory blocks of the plurality of memory blocks;
an erase count manager configured to manage the accumulated erase count value and the open block erase count value of each of the plurality of memory blocks; and
a memory block manager configured to select the target memory block based on the accumulated erase count value and the open block erase count value of each of the plurality of memory blocks.

6. The memory system according to claim 5, wherein the erase count manager comprises:
an accumulated erase counter configured to count a number of erase operations that have been performed on each of the plurality of memory blocks to determine the accumulated erase count value; and
an open block erase counter configured to count the number of the erase operations that have been performed on each of the plurality of memory blocks in an open block state to determine the open block erase count value.

7. A method of operating a memory system comprising:
performing an erase operation on a selected memory block among a plurality of memory blocks;
increasing an accumulated erase count value of the selected memory block which represents a total number of erase operations performed on the selected memory block;
increasing an open block erase count value of the selected memory block which represents a total number of erase operations that have been performed on the selected memory block while the selected memory block is in an open block state when the selected memory block is in the open block state when the erase operation is performed; and
updating the accumulated erase count value and the open block erase count value of the selected memory block.

8. The method according to claim 7, wherein the open block state corresponds to a state in which at least one of a plurality of pages in the selected memory block is in an erased state.

9. The method according to claim 7, further comprising selecting a target memory block on which a program operation is to be performed, based on priority orders of the plurality of memory blocks.

10. The method according to claim 9, wherein a memory block having a lowest accumulated erase count value among the plurality of memory blocks has a highest priority.

11. The method according to claim 10, wherein a memory block having a highest open block erase count value among a plurality of memory blocks having the lowest accumulated erase count value has a highest priority.

12. A method of operating a memory system comprising:
selecting a target memory block based on a priority order of a plurality of memory blocks; and
performing a program operation on the target memory block,
wherein the priority order of the plurality of memory blocks is determined by using both respective accumulated erase count values each of which represents a total number of erase operations performed on the plurality of memory blocks, respectively, and respective open block erase count values each of which represents a total number of erase operations that have been performed on the plurality of memory blocks, respectively while the plurality of memory blocks are in an open block state.

13. The method according to claim 12, wherein the open block state corresponds to a state in which at least one of a plurality of pages in the corresponding memory block is in an erased state.

14. The method according to claim 12, wherein a memory block having a lowest accumulated erase count value among the plurality of memory blocks has a highest priority.

15. The method according to claim 14, wherein a memory block having a highest open block erase count value among a plurality of memory blocks having the lowest accumulated erase count value has a highest priority.

* * * * *